(12) United States Patent
Maeda

(10) Patent No.: US 11,485,352 B2
(45) Date of Patent: Nov. 1, 2022

(54) VEHICLE CONTROL DEVICE

(71) Applicant: TOYOTA JIDOSHA KABUSHIKI KAISHA, Toyota (JP)

(72) Inventor: Eiji Maeda, Kanagawa-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 182 days.

(21) Appl. No.: 17/123,283

(22) Filed: Dec. 16, 2020

(65) Prior Publication Data
US 2021/0197791 A1 Jul. 1, 2021

(30) Foreign Application Priority Data
Dec. 25, 2019 (JP) .............................. JP2019-234630

(51) Int. Cl.
*B60W 20/15* (2016.01)
*B60K 6/26* (2007.10)
*B60K 6/28* (2007.10)
*F02M 26/14* (2016.01)
*B60W 20/20* (2016.01)
*B60W 20/12* (2016.01)
(Continued)

(52) U.S. Cl.
CPC ............ *B60W 20/15* (2016.01); *B60K 6/26* (2013.01); *B60K 6/28* (2013.01); *B60W 20/12* (2016.01); *B60W 20/20* (2013.01); *B60W 30/188* (2013.01); *B60W 30/192* (2013.01); *F02M 26/14* (2016.02); *B60K 6/48* (2013.01); *B60W 2510/0666* (2013.01); *B60W 2510/0676* (2013.01); *B60W 2510/244* (2013.01); *B60W 2556/50* (2020.02); *B60W 2710/0677* (2013.01)

(58) Field of Classification Search
CPC ...... B60W 20/15; B60W 20/12; B60W 20/20; B60W 30/188; B60W 2510/0666; B60W 2510/0676; B60W 2710/0622; B60W 2710/0677; B60W 2710/0666; B60W 2556/50; F02M 26/14; B60K 6/26; B60K 6/28; B60K 6/48
See application file for complete search history.

(56) References Cited

U.S. PATENT DOCUMENTS

2016/0101774 A1* 4/2016 Morisaki .............. B60W 50/14 701/22
2018/0236997 A1* 8/2018 Quix ................. B60W 50/0097
2020/0355134 A1* 11/2020 Kelly .................. F02D 41/0085

FOREIGN PATENT DOCUMENTS

JP 2016-078535 A 5/2016

* cited by examiner

*Primary Examiner* — George C Jin
(74) *Attorney, Agent, or Firm* — Sughrue Mion, PLLC

(57) ABSTRACT

A vehicle control device controls a hybrid vehicle including: an internal combustion engine having an EGR device; an electric drive device that drives the vehicle and performs an engine-based power generation; a power storage device; and a travel route acquisition device. The vehicle include an EV drive mode and an HV drive mode. The vehicle control device is configured to: where the vehicle is started under a cold condition, calculate, based on the travel route information, an average vehicle driving power in a vehicle running section under a warm condition after the start; and limit the amount of power generated by the engine-based power generation in the cold condition to be smaller when the calculated average vehicle driving power is high than when it is low, and, during the HV drive mode after a transition to the warm condition, execute the engine-based power generation accompanied by the EGR.

2 Claims, 8 Drawing Sheets

(51) Int. Cl.
*B60W 30/188* (2012.01)
*B60W 30/192* (2012.01)
*B60K 6/48* (2007.10)

VEHICLE CONTROL DEVICE

CROSS-REFERENCE TO RELATED APPLICATION

The present disclosure claims priority under 35 U.S.C. § 119 to Japanese Patent Application No. 2019-234630, filed on Dec. 25, 2019. The content of which is incorporated herein by reference in its entirety.

BACKGROUND

Technical Field

The present disclosure relates to a vehicle control device for controlling a hybrid vehicle.

Background Art

JP 2016-078535 A discloses an information processing device for a hybrid vehicle. The information processing device calculates a travel route from a departure point to a destination. Then, the information processing device plans to assign, as the drive mode of the hybrid vehicle, either a first mode or a second mode to a plurality of sections included in the calculated travel route from the viewpoint of improving fuel efficiency. Furthermore, the information processing device notifies an occupant of the hybrid vehicle in advance of the actual state of the fuel efficiency improvement effect based on this kind of travel plan.

SUMMARY

A hybrid vehicle is known that includes an internal combustion engine having an EGR device configured to perform exhaust gas recirculation, and an electric drive device. The electric drive device includes one or more rotating electrical machines, and is configured to drive the hybrid vehicle and perform an engine-based power generation using the power of the internal combustion engine. In this kind of hybrid vehicle, it is desired to consider the following points in order to improve the fuel efficiency of the internal combustion engine for the travel route to a destination.

When an internal combustion engine included in a hybrid vehicle has an EGR device, the engine thermal efficiency can be improved by operating the internal combustion engine while performing exhaust gas recirculation by the EGR device. However, the EGR device cannot be used under cold conditions (engine unwarmed state) in which the engine temperature is lower than a permitted temperature for starting the exhaust gas recirculation.

Furthermore, in order to improve the fuel efficiency of the entire vehicle trip, it is conceivable to perform the following control. That is, the engine-based power generation is actively performed during the warm-up of the internal combustion engine to increase the charge amount of a power storage device. After that, an EV drive mode in which an electric drive device is driven by the electric power of the power storage device to drive the hybrid vehicle is used. However, the earnest research by the inventor of the present application revealed that whether or not the amount of power generated using the engine-based power generation should be increased under the cold conditions (engine unwarmed state) in order to secure the electric power required for the EV drive mode differs depending on the average vehicle driving power (running load) in a vehicle running section under a warm condition (i.e., a condition after the engine warm-up is completed).

The present disclosure has been made in view of the problem described above, and an object of the present disclosure is to provide a vehicle control device for a hybrid vehicle that can perform an engine-based power generation in a manner that is excellent in improving the fuel efficiency of the entire vehicle trip by considering the average vehicle driving power in a vehicle running section under a warm condition (i.e., a condition after the engine warm-up is completed).

A vehicle control device according to the present disclosure is configured to control a hybrid vehicle that includes: an internal combustion engine that includes an EGR device configured to perform exhaust gas recirculation that causes a part of exhaust gas discharged to an exhaust gas passage to recirculate into a cylinder; an electric drive device that includes one or more rotating electrical machines and is configured to drive the hybrid vehicle and perform an engine-based power generation being electric power generation using power of the internal combustion engine; a power storage device configured to be chargeable and dischargeable by transmitting and receiving electric power to and from the electric drive device; and a travel route acquisition device configured to acquire a travel route information from a departure point to a destination of the hybrid vehicle. The hybrid vehicle has drive modes that include: an EV drive mode in which the electric drive device is driven by the electric power of the power storage device to drive the hybrid vehicle without using a driving force of the internal combustion engine; and an HV drive mode in which the hybrid vehicle is driven by a driving force of at least one of the electric drive device and the internal combustion engine while performing the engine-based power generation. The vehicle control device includes a processor configured to: where the hybrid vehicle is started under a cold condition in which temperature of the internal combustion engine is lower than a temperature threshold value that allows a start of the exhaust gas recirculation, calculate, based on the travel route information, an average vehicle driving power in a vehicle running section under a warm condition after the temperature of the internal combustion engine reaches the temperature threshold value after the start of the hybrid vehicle; and limit an amount of power generated by the engine-based power generation in the cold condition so as to be smaller when the calculated average vehicle driving power is high than when the calculated average vehicle driving power is low, and, during the HV drive mode after a transition to the warm condition, execute the engine-based power generation accompanied by the exhaust gas recirculation with an EGR ratio that increases engine thermal efficiency.

The vehicle control device may be configured to reduce the amount of power generated using the engine-based power generation in the cold condition by a greater amount when the calculated average vehicle driving power is higher.

According to the vehicle control device of the present disclosure, where the hybrid vehicle is started under the cold condition, in accordance with the average vehicle driving power in the vehicle running section under the warm condition after the start of the hybrid vehicle (i.e., after the engine warm-up completion), the amount power generated by the engine-based power generation in the above-described cold condition is changed as described above. In order to enhance the effect of improving the fuel efficiency of the entire vehicle trip when the average vehicle driving power in the warm condition is low, it is effective to increase the amount of power generated by the engine-based power generation under the cold condition (i.e., during the engine warm-up) and to use the increased power generation amount in the EV drive mode under the subsequent warm condition. When, on the other hand, the average vehicle driving power in the warm condition is high, rather than increasing the amount of power generated by the engine-based power generation in the cold condition, increasing the amount of power generated by the engine-based power generation accompanied by the exhaust gas recirculation in the warm condition is more effective in enhancing the effect of improving the fuel efficiency of the entire vehicle trip. The vehicle control device of the present disclosure makes it possible to select a manner of excellent engine-based power generation in accordance with the average vehicle driving power under the warm condition and to enhance the effect of improving the fuel efficiency of the entire vehicle trip.

DETAILED DESCRIPTION

Figure 1:
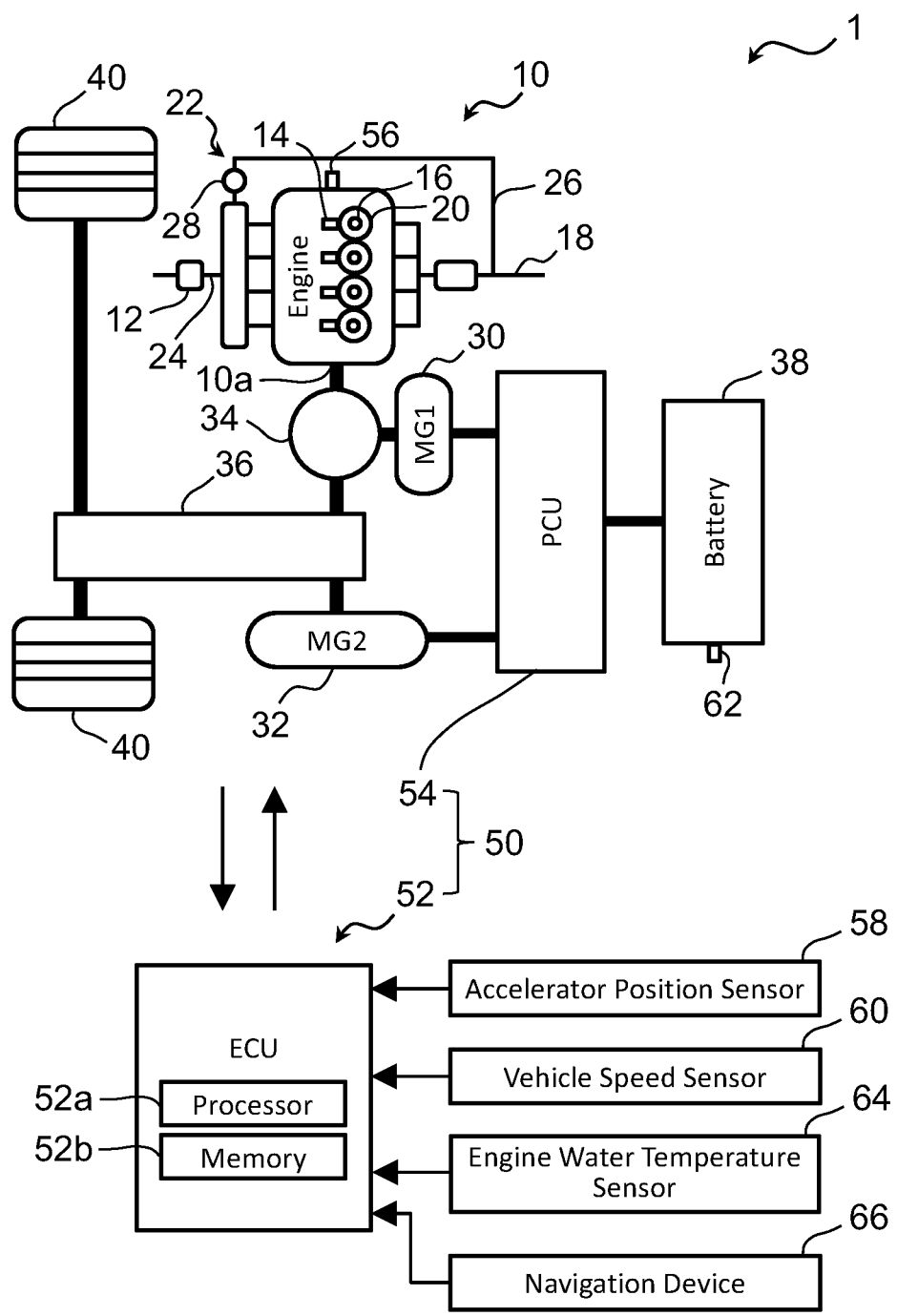
FIG. 1 is a schematic diagram showing a configuration of a powertrain system of a hybrid vehicle which is controlled by a vehicle control device according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 4.

1-1. Example of System Configuration

FIG. 1 is a schematic diagram showing a configuration of a powertrain system of a hybrid vehicle 1 which is controlled by a vehicle control device 50 according to the first embodiment. The hybrid vehicle 1 shown in FIG. 1 is a power split type as an example. The hybrid vehicle 1 includes an internal combustion engine 10, a first motor generator 30 (MG1), a second motor generator 32 (MG2), a power split device 34, a speed reducer 36, a battery 38 and the vehicle control device 50.

The internal combustion engine 10 is a spark ignition engine as an example, and is equipped with a throttle valve 12, a fuel injection device (only fuel injection valves are shown) 14, and an ignition device (only spark plugs are shown) 16 as actuators for controlling engine torque Te. The internal combustion engine 10 has a crankshaft 10a that is mechanically coupled to vehicle wheels 40 via the power split device 34 and the speed reducer 36. That is to say, the engine torque Te is transmitted to the vehicle wheels 40 via the power split device 34 and the speed reducer 36.

The internal combustion engine 10 includes an EGR device 22 configured to perform exhaust gas recirculation (EGR) for recirculating a part of the exhaust gas discharged to an exhaust gas passage 18 to cylinders 20. The EGR device 22 is, for example, an external EGR device that includes an EGR passage 26 configured to connect the exhaust gas passage 18 and an intake air passage 24, and an EGR valve 28 configured to open and close the EGR passage 26. It should be noted that, in place of or in combination with the external EGR device 22, the "EGR device" according to the present disclosure may include an internal EGR device configured to perform exhaust gas recirculation by controlling a variable valve train that makes variable a valve overlap period of intake and exhaust valves.

The first motor generator (first MG) 30 and the second motor generator (second MG) 32 are, for example, three-phase AC type motor generators. In the example of the hybrid vehicle 1, the first MG 30 and the second MG 32 correspond to an example of the "electric drive device including one or more rotating electrical machines" according to the present disclosure. The rotating electrical machine mentioned here has a function of at least one of an electric motor and a generator. The MGs 30 and 32 have a function of both the electric motor and the generator.

The power split device 34 is configured by a planetary gear unit. To be more specific, a rotation shaft of the first MG 30 is coupled to a sun gear of the planetary gear unit. A rotation shaft (crankshaft 10a) of the internal combustion engine 10 is coupled to a planetary carrier thereof. A rotation shaft of the MG2 and the speed reducer 36 are coupled to a ring gear thereof. The power split device 34 divides and transmits the (motive) power of the internal combustion engine 10 (i.e., engine power) to the first MG 30 and the vehicle wheels 40.

The battery 38 is configured to be chargeable and dischargeable by transmitting and receiving electric power to and from the electric drive device (first MG 30 and second MG 32). The battery 38 is a secondary battery, such as nickel metal hydride or lithium ion, and corresponds to an example of the "power storage device" according to the present disclosure. The power storage device may be, for example, an electric double layer capacitor in place of or in combination with a battery. It should be noted that the power storage device according to the present disclosure may be configured to be rechargeable using a power source outside the hybrid vehicle. That is, the hybrid vehicle according to the present disclosure may have a plug-in function for external charging.

The vehicle control device 50 is configured to control the hybrid vehicle 1 (more specifically, the internal combustion engine 10, the first MG 30 and the MG 32). The vehicle control device 50 includes an electronic control unit (ECU) 52 and a power control unit (PCU) 54. The PCU 54 is an electric power converter including inverters for driving the first MG 30 and the second MG 32, and controls the first MG 30 and the second MG 32 on the basis of commands from the ECU 52.

The first MG 30 is mainly used as a generator. In detail, the first MG 30 uses the engine power divided by the power split device 34 to generate electric power (hereinafter, referred to as an "engine-based power generation"). The PCU 54 converts the electric power generated by the first MG 30 from alternating current to direct current and causes it to be stored in the battery 38. As a result, the battery 38 is charged. The PCU 54 also converts the electric power stored in the battery 38 from direct current to alternating current and supplies it to the second MG 32. Furthermore, the PCU 54 can also supply the electric power generated by the first MG 30 to the second MG 32 without going through the battery 38.

The second MG 32 is mainly used as an electric motor for driving the hybrid vehicle 1. In detail, the second MG 32 is driven using the electric power supplied from the battery 38 and the electric power supplied from the first MG 30 without going through the battery 38. Similar to the engine torque Te, a motor torque Tm outputted from the second MG 32 is also transmitted to the vehicle wheels 40 via the speed reducer 36. Thus, the present powertrain system can drive the hybrid vehicle 1 by using the engine torque Te and the motor torque Tm.

The ECU 52 includes a processor 52a and a memory 52b. The memory 52b stores various data including maps used for controlling the internal combustion engine 10, the first MG 30 and the second MG2, and also stores various control programs. The processor 52a receives the control program from the memory 52b and executes it. As a result, various kinds of processing and controls by the vehicle control device 50 are achieved. It should be noted that the vehicle control device 50 may be configured using a plurality of ECUs. In detail, the vehicle control device 50 may individually include, for example, an ECU for controlling the entire powertrain system, an ECU for controlling the internal combustion engine 10, an ECU for controlling the first MG 30, and an ECU for controlling the second MG 32.

The ECU 52 receives sensor signals from various sensors for controlling the operation of the powertrain system of the hybrid vehicle 1. The various sensors mentioned here include a crank angle sensor 56 for detecting a crank angle, an accelerator position sensor 58 for detecting the amount of depression of an accelerator pedal (i.e., accelerator position Acc), a vehicle speed sensor 60 for detecting the speed of the hybrid vehicle 1 (vehicle speed V), an electric current sensor 62 for detecting an electric current flowing through the battery 38, and an engine water temperature sensor for detecting an engine cooling water temperature (engine water temperature Tw). The ECU 52 can calculate an engine speed Ne on the basis of the signals of the crank angle sensor 56. In addition, the electric current sensor 62 is used to calculate the state of charge (SOC) of the battery 38.

The hybrid vehicle 1 further includes a navigation device 66. The navigation device 66 is configured to acquire the current position of the hybrid vehicle 1 on a road map using the Global Navigation Satellite System (GNSS). Also, the navigation device 66 has a function of selecting a travel route R from the departure point to the destination of the hybrid vehicle 1 with reference to a map information database (not shown) when the destination is set by the occupant of the hybrid vehicle 1. Furthermore, the navigation device 66 is configured to acquire information on the selected travel route R (travel route information). The travel route information includes, for example, the distance information, the average vehicle speed information, the altitude information and the traffic jam information in the travel route R. The travel route information acquired by the navigation device 66 is outputted to the ECU 52. It should be noted that the navigation device 66 corresponds to an example of the "travel route acquisition device" according to the present disclosure.

1-2. Basic Operation of Powertrain System

Drive modes, the exhaust gas recirculation (EGR) and engine warm-up operation in the powertrain system of the hybrid vehicle 1 shown in FIG. 1 will be described.

1-2-1. Drive Modes

The drive modes of the hybrid vehicle 1 include an "EV drive mode" and an "HV drive mode". The EV drive mode is a mode in which the second MG 32 is driven by the electric power of the battery 38 to drive the hybrid vehicle 1 without using the driving force of the internal combustion engine 10. On the other hand, the HV drive mode is a mode in which the hybrid vehicle 1 is driven by both the driving forces of the internal combustion engine 10 and the second MG 32 while performing the engine-based power generation.

1-2-1-1. Outline of HV Drive Mode

According to the HV drive mode, the ECU 52 calculates a vehicle required power Pvr, which is a required value of vehicle driving power Pv [kW] from the driver. Calculation of the vehicle required power Pvr is typically performed based on the accelerator position Acc and the vehicle speed V. Then, the ECU 52 calculates an engine required power Per (=Pvr−Pbr) by subtracting a charge/discharge required power Pbr of the battery 38 from the calculated vehicle required power Pvr. It is assumed herein that the charge/discharge required power Pbr is positive at the time of discharging the battery 38 and is negative at the time of charging. Therefore, when there is a charge request of the battery 38, a value obtained by adding the absolute value of the charge/discharge request power Pbr to the vehicle required power Pvr corresponds to the engine required power Per.

Figure 2:
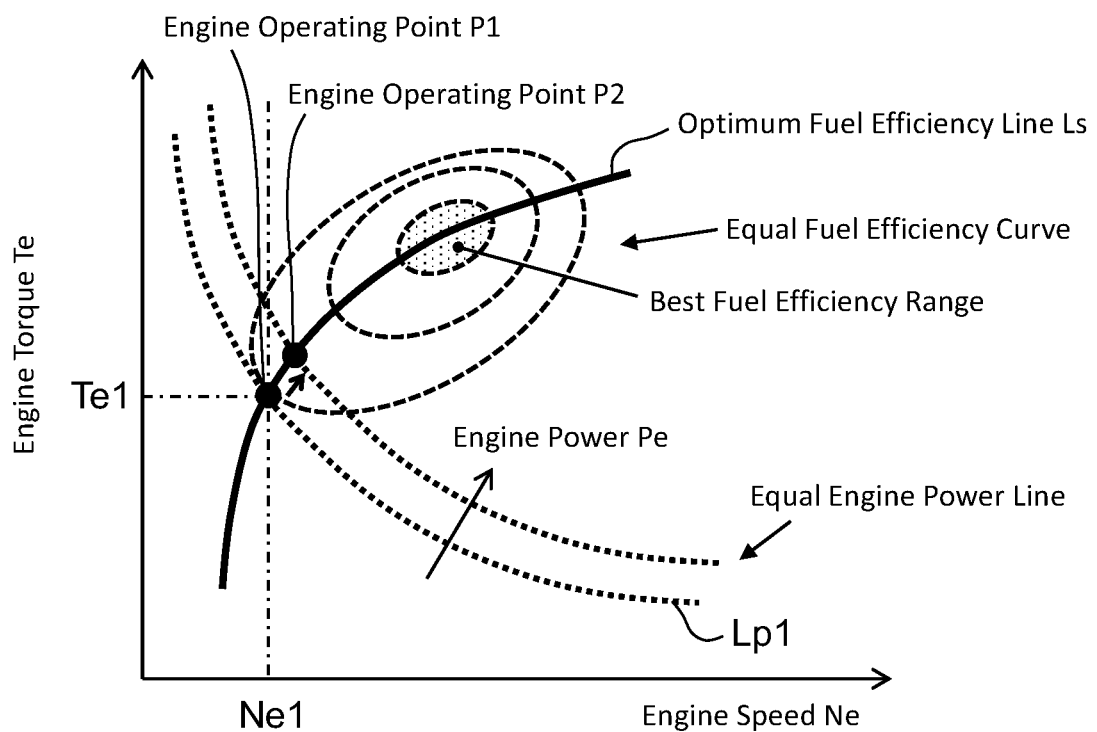
FIG. 2 is a graph used to describe a method of determining an engine operating point P during execution of an HV drive mode.

FIG. 2 is a graph used to describe a method of determining an engine operating point P during the execution of the HV drive mode. The engine operating point P is determined by the engine torque Te and the engine speed Ne as shown in FIG. 2. FIG. 2 shows a plurality of equal engine power lines, a plurality of equal fuel efficiency curves and one optimum fuel efficiency line Ls. The optimal fuel efficiency line Ls is preset such that the fuel efficiency of the internal combustion engine 10 becomes optimum in consideration of the equal fuel efficiency curves determined depending on the specifications of the internal combustion engine 10. The ECU 52 basically determines the engine operating point P so as to pass on the optimal fuel efficiency line Ls. In detail, the ECU 52 determines, as the engine operating point P, the intersection point between the engine required power Per calculated as described above and the optimum fuel efficiency line Ls.

The ECU 52 stores the relationship as represented in FIG. 2. For example, when the determined engine required power Per is located on an equal engine power line Lp1 in FIG. 2, the ECU 52 determines an intersection P1 between the equal engine power line Lp1 and the optimum fuel efficiency line Ls as the engine operating point P. Then, the ECU 52 determines an engine torque Te1 and an engine speed Ne1 associated with the intersection (engine operating point) P1 as a target engine torque Tet and a target engine speed Net, respectively.

In the example of the hybrid vehicle 1 having the power split device 34, when the engine operating point P (Ne, Te) is determined under a vehicle speed V and a vehicle required torque (required value of vehicle driving torque Tv) Tvr, the remaining torque Tg and rotational speed Ng of the first MG 30, and the remaining torque Tm and rotational speed Nm of the second MG 32 are also determined accordingly. The ECU 52 controls the respective actuators (i.e., the throttle valve 12, the fuel injection device 14 and the ignition device 16) of the internal combustion engine 10 such that the determined target engine torque Tet and target engine speed Net are achieved, and also controls the PCU 54 such that the torques Tg and Tm and rotational speeds Ng and Nm that are determined as described above are achieved. Furthermore, as a result of determining the torques Tg and Tm and the rotational speed Ng and Nm, charge/discharge power Pb of the battery 38 is also determined. This is because the charge/discharge power Pb has a value according to the product of the torque Tg and rotational speed Ng of the first MG 30 and the product of the torque Tm and rotational speed Nm of the second MG 32. It should be noted that the vehicle required torque Tvr is calculated from the vehicle required power Pvr and the vehicle speed V.

The charge/discharge required power Pbr described above is determined, for example, based on the SOC of the battery 38. In detail, when the (actual) SOC is lower than a lower limit of a designated target control range $R_{SOC}$ (that is, when there is a request to charge the battery 38), the engine required power Per is increased to be higher than the vehicle required power Pvr by the absolute value of the charge/discharge required power Pbr as described above. Consequently, the electric power generated by the first MG 30 increases. More specifically, the greater the shortage of the actual SOC with respect to the lower limit of the target control range $R_{SOC}$, the greater the electric power generated by the first MG 30 becomes, and as a result, the charge of the battery 38 is promoted.

(Reduction of Electrical Loss During HV Drive Mode)

As described above, the PCU 54 can supply the electric power generated by the first MG 30 to the second MG 32 without passing through the battery 38. Accordingly, when the actual SOC is within the target control range Rsoc during the execution of the HV drive mode (i.e., when there is no request to charge the battery 38), the ECU 52 controls the PCU 54 such that the electric power generated by the first MG 30 using the engine-based power generation is supplied to the second MG 32 without passing through the battery 38. As a result, the second MG 32 uses the electric power supplied directly from the first MG 30 to drive the vehicle wheels 40 while the internal combustion engine 10 drives the first MG 30 and the vehicle wheels 40. Thus, the HV drive mode can be performed while reducing (avoiding) the electrical loss caused by the charging and discharging of the battery 38, as compared with an example in which the battery 38 supplies the electric power to the second MG 32 while the first MG 30 generates electric power that is supplied to the battery 38. It should be noted that, at the time of rapid acceleration, the HV drive mode is performed while the electric power from the battery 38 is supplied to the second MG 32 in addition to the electric power from the first MG 30 in order to exhibit high power performance.

1-2-1-2. Outline of EV Drive Mode

According to the EV drive mode, the second MG 32 drives the vehicle wheels 40 using the electric power supplied from the battery 38. The ECU 52 controls the PCU 54 such that the torque Tm that achieves the vehicle required torque Tvr is outputted from the second MG 32.

If the internal combustion engine 10 is started when the engine required power Per is low, the internal combustion engine 10 will operate with a low engine thermal efficiency (net thermal efficiency). For this reason, when the engine required power Per falls below a designated power threshold value THpe during the execution of the HV drive mode, the ECU 52 determines that the execution condition of the EV drive mode has been satisfied, and then stops the operation of the internal combustion engine 10 to switch the drive mode to the EV drive mode. As a result, the fuel efficiency can be improved as compared with an example in which the internal combustion engine 10 is operated when the engine required power Per is low.

Contrary to the above, when the engine required power Per exceeds the power threshold value THpe during the execution of the EV drive mode, the ECU 52 determines that the execution condition of the EV drive mode is no longer satisfied, and then starts the internal combustion engine 10 to switch the drive mode to the HV drive mode. Moreover, even when the (actual) SOC falls below a designated threshold value THsoc during the execution of the EV drive mode, the ECU 52 determines that the execution condition of the EV drive mode is no longer satisfied, and then performs switching to the HV drive mode. As a result, the SOC can be recovered (increased) using engine-based power generation.

1-2-2. Exhaust Gas Recirculation (EGR)

The ECU 52 can perform the exhaust gas recirculation (EGR) using the EGR device 22 during engine operation. In detail, the ECU 52 prohibits the execution of EGR under a cold condition CC (in other words, an engine unwarmed condition) in which the engine water temperature Tw is lower than a designated temperature threshold value THtw (i.e., an EGR start permitted temperature). On the other hand, the ECU 52 permits the execution of EGR under a warm condition HC (in other words, a condition after the engine warm-up is completed) in which the engine water temperature Tw is equal to or higher than the temperature threshold value THtw. Therefore, when an engine start (cold start) is performed under the cold condition CC, the EGR is started after the engine water temperature Tw reaches the temperature threshold value THtw (i.e., after the engine warm-up is completed) on condition that there are no other EGR prohibition conditions. When, on the other hand, an engine start is performed under the warm condition HC, the EGR is immediately permitted, and the EGR is immediately started on condition that there are no other EGR prohibition conditions.

The execution of EGR has an excellent effect on improving fuel efficiency (i.e., improving engine thermal efficiency). Because of this, when operating the internal combustion engine 10 under the warm condition HC, the ECU 52 performs the EGR unless there are other EGR prohibition conditions. The EGR is performed with an EGR ratio within "an EGR ratio range that increases engine thermal efficiency" as compared to when the EGR is not performed. This kind of EGR ratio range is different depending on the specifications of the internal combustion engine, and can be determined, for example, by conducting an experiment in advance. When the EGR is performed in this way, the engine load (i.e., throttle opening degree) required to obtain the same engine torque Te as when the EGR is not performed increases. As a result, the pump loss can be reduced. Furthermore, when the EGR is performed, the cooling loss can also be reduced because the combustion temperature is lowered. Therefore, the fuel efficiency (engine thermal efficiency) can be improved by the execution of the EGR.

Additionally, the engine water temperature Tw and the temperature threshold value THtw respectively correspond to an example of the "temperature of the internal combustion engine" and the "temperature threshold value" according to the present disclosure. The "temperature of the internal combustion engine" mentioned here is not limited to the engine water temperature Tw as long as it can evaluate the engine temperature, and may be, for example, an engine lubricating oil temperature.

1-2-3. Engine Warm-Up Operation

According to the hybrid vehicle 1, when the vehicle system is started (i.e., when the power switch of the vehicle 1 is turned ON) under the cold condition CC, the ECU 52 starts the internal combustion engine 10 to perform the engine warm-up operation prior to the start of the EV drive mode even under such a low engine required power Per that the EV drive mode is selected if the vehicle system is started under the warm condition HC. The vehicle drive mode during the engine warm-up operation is the HV drive mode because the internal combustion engine 10 is operating. It should be noted that, in an example of the HV drive mode executed during the engine warm-up operation, even during a temporary stop of the hybrid vehicle 1, the internal combustion engine 10 is not stopped to continue the engine warm-up operation.

Additionally, if the engine warm-up operation is performed under the condition that the low engine required power Per as described above continues, the engine warm-up operation is terminated when the engine water temperature Tw reaches the temperature threshold value THtw, and the internal combustion engine 10 is stopped. The EV drive mode is then started. Furthermore, if the engine water temperature Tw reaches the temperature threshold value THtw while the engine required power Per has risen to the usage range of the HV drive mode during the engine warm-up operation, the engine operation is continued until the engine required power Per decreases thereafter to the use range of the EV drive mode.

1-3. Issue on Efficient Engine-Based Power Generation

An issue on the execution of engine-based power generation for improving the fuel efficiency of the entire trip of the hybrid vehicle 1 after the vehicle system is started under the cold condition CC that requires the engine warm-up operation will be described. In the following explanation, with respect to the power generation amount (i.e., the amount of electric power) Wg [kWh] by the engine-based power generation using the first MG 30, the power generation amount Wg of the engine-based power generation performed during the engine warm-up is particularly referred to as a "power generation amount Wgw".

As a method of improving the fuel efficiency of the entire vehicle trip, there is the following method A. According to this method A, by increasing the engine load (engine torque Te) during the engine warm-up operation, the engine power Pe is increased so as to be higher than a value Pe1 of the engine power Pe required to satisfy the vehicle required power Pvr. Then, the surplus of the engine power Pe with respect to this value Pe1 is used to increase the electric power generated by the first MG 30, and as a result, the power generation amount Wgw is increased. By using this kind of method A, the engine power Pe is increased, and the completion of the engine warm-up can thus be accelerated. Furthermore, during the engine warm-up operation immediately after the start of the vehicle running, it is unlikely that a high engine power Pe that exceeds the best fuel efficiency range (see FIG. 2) will be used. Therefore, when the engine power Pe is increased by the method A, the engine operating point P approaches the best fuel efficiency range as in the example of moving the engine operating point P from P1 to P2 in FIG. 2, thereby improving the engine thermal efficiency. This also applies to when the engine power Pe is increased from the idling state by the method A.

According to the method A described above, by increasing the power generation amount Wgw of the first MG 30 during the engine warm-up, the EV drive mode can be started after the engine warm-up with the SOC of the battery 38 increased as compared with an example without using the method A. The distance that can be traveled in the EV drive mode started after the engine has warmed up (i.e., EV mileage) becomes longer when the SOC at the start of the EV drive mode is higher. Because of this, by the use of the method A, it is possible to extend the EV mileage after the engine warm-up (i.e., after reaching the warm condition HC). Also, the amount of electric power that contributes to the extension of this EV mileage is obtained while achieving early warm-up and improvement of the engine thermal efficiency during the engine warm-up. Furthermore, the extension of the EV mileage means that the engine operation can be reduced when the engine thermal efficiency is low. Therefore, the effect of improving the fuel efficiency of the entire vehicle trip can be expected by the use of the method A.

Hereinafter, the average value of the vehicle driving power Pv in a certain vehicle running section is referred to as an "average vehicle driving power (or simply, average vehicle power) Pva". Also, the average vehicle power Pva in the vehicle running section after the warm condition HC (i.e., engine warm-up completion state) is reached after the start-up of the vehicle system in the cold condition CC is simply referred to as an "average vehicle power Pva after the engine warm-up".

According to the conventional knowledge, increasing the engine load during the engine warm-up using the above-described method A to increase the power generation amount Wgw was considered to be effective regardless of the average vehicle power Pva (running load) [kW] after the engine warm-up. In this regard, the earnest research by the inventor of the present application disclosure has resulted in further knowledge that, depending on the average vehicle power Pva after the engine warm-up, increasing the power generation amount Wgw during the engine warm-up using the method A may, conversely, deteriorate the fuel efficiency of the entire vehicle trip.

Specifically, according to the further knowledge described above, when the average vehicle power Pva after the engine warm-up is low, a high fuel efficiency improvement effect can be expected by using the method A and also by actively using the EV drive mode instead of performing engine operation in a low engine power state with low engine thermal efficiency. On the other hand, the higher the average vehicle power Pva after the engine warm-up is, the higher the total efficiency of fuel efficiency and electric power consumption during the HV drive mode becomes. As a result, the fuel efficiency improvement effect by the selection of the EV drive mode decreases. The latter reasons (the following first to third reasons) will be described below in detail.

First, it can be said that, when the average vehicle power Pva after the engine warm-up is high, the frequency with which high engine power Pe is required during the running of the vehicle increases. Because of this, one of the above reasons (i.e., the first reason) is that, as the engine power Pe increases, the frequency of use of the engine operating region with high engine thermal efficiency increases. More specifically, in an example in which the engine operating point P is controlled along the optimum fuel efficiency line Ls as shown in FIG. 2, the effect of improving the engine thermal efficiency can be obtained when the engine operation point P approaches the best fuel efficiency range with an increase in the engine required power Per. Then, the second reason is that the EGR can be used after the engine warm-up. In addition, in the example of the powertrain system using the power split device 34 shown in FIG. 1, during the execution of the HV drive mode, the electric power generated by the engine-based power generation can be supplied from the first MG 30 to the second MG 32 without passing through the battery 38 as already described. Because of this, the third reason is that the second MG 32 can be used for driving the hybrid vehicle 1 while reducing the electrical loss due to the charging and discharging of the battery 38, as compared with an example in which the electric power generated and stored in the battery 38 during the engine warm-up is taken out from the battery 38 after the engine warm-up and is used during the execution of the HV drive mode.

Due to the reasons as described above (that is, reduction of the fuel consumption (see the first and second reasons) and reduction of the electrical loss due to the charging and discharging of the battery 38 (see the third reason)), it can be said that, when the average vehicle power Pva after the engine warm-up is high, the effect of improving the fuel efficiency of the entire vehicle trip can be enhanced by limiting the power generation amount Wgw during the engine warm-up to be low, rather than by actively increasing the power generation amount Wgw during the engine warm-up to increase the SOC of the battery 38.

1-4. Engine-Based Power Generation Control

In view of the issue (the further knowledge) described above, according to the present embodiment, the ECU 52 executes the following "engine-based power generation control". This engine-based power generation control is performed when the hybrid vehicle 1 is started in the cold condition CC. Then, according to the engine-based power generation control, the ECU 52 calculates the average vehicle power Pva after the engine warm-up, based on the travel route information received from the navigation device 66. Moreover, the ECU 52 limits the power generation amount Wgw by the engine-based power generation under the cold condition CC (i.e., during the engine warm-up) to be lower when the calculated average vehicle power Pva is high than that when it is low. Furthermore, during the execution of the HV drive mode after the transition to the warm condition HC (i.e., after the engine the warm-up), the engine-based power generation accompanied by the EGR using the EGR ratio that increases the engine thermal efficiency is performed.

To be more specific, according to the engine-based power generation control in the present embodiment, as an example, when the average vehicle power Pva after the engine warm-up is lower than a designated power threshold value THp, the method A is used. That is, the power generation amount Wgw during the engine warm-up is positively increased. When, on the other hand, the average vehicle power Pva is equal to or higher than the power threshold value THp, actively increasing the power generation amount Wgw during the engine warm-up using the method A is not performed (in other words, increasing the power generation amount Wgw is limited).

1-4-1. Processing by ECU

Figure 3:
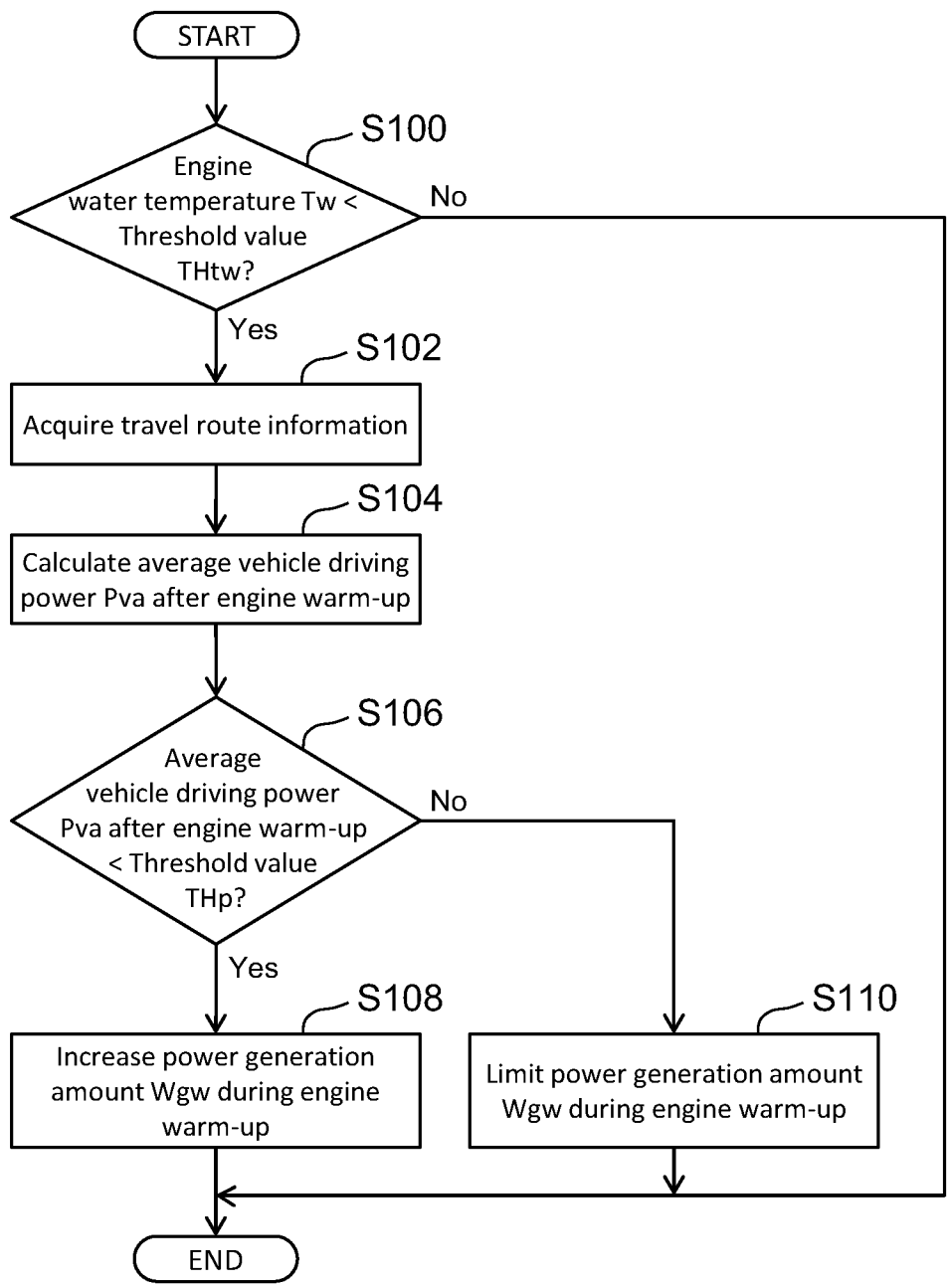
FIG. 3 is a flowchart illustrating a flow of processing that is executed for control of a power generation amount Wgw of a first motor generator (see FIG. 1) during engine warm-up.

Then, the processing related to the engine-based power generation control according to the present embodiment will be described with reference to FIGS. 3 and 4. First, FIG. 3 is a flowchart illustrating the flow of the processing that is executed for the control of the power generation amount Wgw of the first MG 30 during the engine warm-up. The ECU 52 executes the processing shown in FIG. 3 once at the start-up of the vehicle system (i.e., when the power switch of the hybrid vehicle 1 is turned ON).

As shown in FIG. 3, the ECU 52 first determines in step S100 whether or not the engine water temperature Tw is lower than the temperature threshold value THtw described above. As a result, when the engine water temperature Tw is equal to or higher than the temperature threshold value THtw, that is, when the internal combustion engine 10 is in the warm condition HC (the engine warm-up completion condition) that can use the EGR, the ECU 52 ends the processing of this flowchart.

When, on the other hand, the engine water temperature Tw is lower than the temperature threshold value THtw, that is, when the internal combustion engine 10 is in the cold condition CC (the engine unwarmed condition) that prohibits the EGR, the ECU 52 proceeds to step S102.

In step S102, the ECU 52 acquires the travel route information relating to the travel route R (for example, the distance information, the average vehicle speed information, the altitude information and the traffic jam information in the travel route R) of the current vehicle trip from the navigation device 66. Thereafter, the ECU 52 proceeds to step S104.

In step S104, the ECU 52 calculates the average vehicle power (average vehicle driving power) Pva in the vehicle running section after the engine warm-up, based on the acquired travel route information. As an example, the distance traveled by the hybrid vehicle 1 during the engine warm-up operation is herein regarded as short, and the ECU 52 uses the travel route information of the entire travel route R acquired from the navigation device 66 to calculate the average vehicle power Pva.

Specifically, the average vehicle speed of the travel route R becomes higher when the proportion of high speed running sections in the travel route R is higher (for example, highway), and conversely, the average vehicle speed becomes lower when the proportion of low speed running section in the travel route R is higher (for example, urban area). In addition, the average vehicle speed becomes lower when the proportion of the running sections where traffic jam occurs is higher. The average vehicle power Pva is calculated so as to be higher when the average vehicle speed which changes due to these factors is higher. Moreover, when the travel route information includes the altitude information, the average vehicle driving torque of the travel route R becomes greater when the proportion uphill sections in the travel route R is higher, and conversely, the average vehicle driving torque becomes smaller when the proportion of downhill sections in the travel route R is higher. The average vehicle power Pva is calculated so as to be higher when the proportion of uphill sections in the travel route R is higher, and conversely, to be lower when the proportion of downhill sections is higher. It should be noted that, instead of the example described above, in order to determine the travel route information of the vehicle running section after the engine warm-up, the information about the vehicle running section during the engine warm-up may be excluded from the total travel route information relating to the travel route R in any manner. For example, the travel route information within a designated distance from the departure point may be excluded. Then, the average vehicle power Pva may be calculated based on the determined travel route information.

After the processing of step S104, the ECU 52 proceeds to step S106 and determines whether or not the calculated average vehicle power Pva is lower than the power threshold value THp described above. The power threshold value THp is determined in advance in accordance with the specifications of the vehicle to which the present powertrain control is applied (e.g., the vehicle class and the type of hybrid system). In addition, the power threshold value THp is a value of the average vehicle power Pva used for determining how to determine the power generation amount Wgw regarding the electric power generated by the first MG 30 during the engine warm-up. In other words, the power threshold value THp is a value for determining whether to prioritize power generation during the engine warm-up (i.e., before the start of the EGR) or after the engine warm-up (i.e., in the EGR available state).

When the average vehicle power Pva is lower than the power threshold value THp in step S106, the ECU 52 proceeds to step S108. In step S108, in order to increase the power generation amount Wgw of the first MG 30 during the engine warm-up, the ECU 52 increases the absolute value of the charge/discharge required power Pbr in the following manner as an example.

The control of the power generation amount Wgw during the engine warm-up can be performed, for example, by changing the charge/discharge required power Pbr during the engine warm-up. In detail, as already described, by increasing the absolute value of the charge/discharge required power Pbr, which takes a negative value when the charging is requested, the engine required power Per increases. As a result, the generated power of the first MG 30 increases. Therefore, by performing the engine warm-up operation with the generated power of the first MG 30 increased in this way, the power generation amount Wgw during the engine warm-up can be increased.

The ECU 52 stores a map (not shown) that defines the relationship between the SOC of the battery 38 and a base value Pbr0 of the charge/discharge required power Pbr. The ECU 52 calculates the base value Pbr0 depending on the SOC from this kind of map. In this step S108, the ECU 52 adds a negative correction value C (for example, −2 to −3 kW) to the base value Pbr0 calculated in this way to calculate the final corrected charge/discharge required power Pbrc. Since the charging is requested, the negative correction value C is added to the negative base value Pbr0. As a result, the absolute value of the corrected charge/discharge required power Pbrc becomes greater than that of the base value Pbr0. Thus, by performing this kind of correction, the electric power generated by the first MG 30 increases, and as a result, the power generation amount Wgw during the engine warm-up increases.

When, on the other hand, the average vehicle power Pva is equal to or higher than the power threshold value THp in step S106, the ECU 52 proceeds to step S110. In step S110, the ECU 52 uses the base value Pbr0 as it is as the charge/discharge required power Pbr during the engine warm-up. As a result, the power generation amount Wgw during the engine warm-up will be limited to be smaller than that when the average vehicle power Pva is lower than the power threshold value THp.

Figure 4:
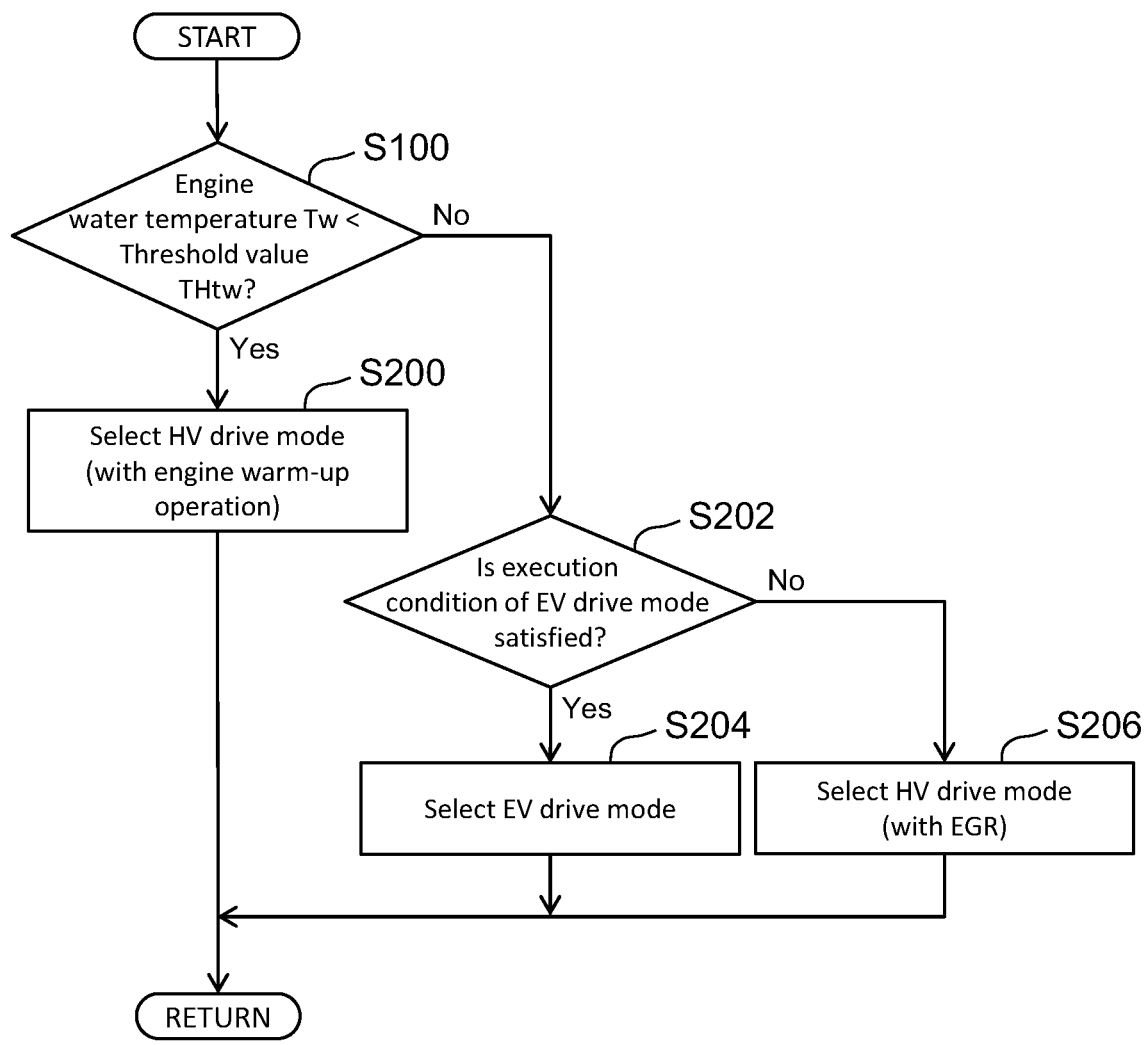
FIG. 4 is a flowchart showing a routine of processing relating to switching of the drive mode of the hybrid vehicle shown in FIG. 1.

Then, FIG. 4 is a flowchart showing a routine of the processing relating to the switching of the drive mode of the hybrid vehicle 1. The ECU 52 repeatedly executes the processing of the present routine after starting the vehicle system.

In the routine shown in FIG. 4, the ECU 52 first determines whether or not the internal combustion engine 10 is warming up in step S100 already described. As a result, when the internal combustion engine 10 is warming up (Tw<THtw), the ECU 52 proceeds to step S200 and selects the HV drive mode while executing the engine warm-up operation. In the HV drive mode selected in the processing of this step S200, the charge/discharge required power Pbr determined by the processing of step S108 or S110 is used. As a result, in accordance with the average vehicle power Pva after the engine warm-up, the power generation amount Wgw during the engine warm-up is increased or decreased.

When, on the other hand, the ECU 52 determines in step S100 that the engine warm-up is completed (Tw≥THtw), the ECU 52 proceeds to step S202. In step S202, the ECU 52 determines whether or not the above described execution condition of the EV drive mode is satisfied on the basis of the engine required power Per and the SOC of the battery 38.

When the execution condition of the EV drive mode is satisfied in step S202, the ECU 52 proceeds to step S204 and selects the EV drive mode. When, on the other hand, the execution condition of the EV drive mode is not satisfied, the ECU 52 proceeds to step S206.

After the engine warm-up is completed, the EGR can be performed on condition that there are no other EGR prohibition conditions. In step S206, the ECU 52 performs the EGR on condition that there are no EGR prohibition conditions while selecting the HV drive mode. As described above, the EGR is performed at a preset EGR ratio within the EGR ratio range that improves the engine thermal efficiency. In addition, when the power generation amount Wgw during the engine warm-up is limited because the average vehicle power Pva after the engine warm-up is equal to or higher than the power threshold value THp in the processing shown in FIG. 3, as long as the operation time of the hybrid vehicle 1 after the engine warm-up is not extremely short, the engine-based power generation for obtaining an electric power amount including compensation due to the limitation of the power generation amount Wgw is performed while performing the EGR during the execution of the HV drive mode selected in this step S206.

1-5. Effect

As described so far, according to the engine-based power generation control of the present embodiment, when the average vehicle power Pva after the engine warm-up is lower than the power threshold value THp, the power generation amount Wgw during the engine warm-up is positively increased using the method A according to the conventional knowledge. The fact that the average vehicle power Pva after the engine warming up is low means that there are more opportunities for the hybrid vehicle 1 to run under the condition that the engine required power Per is low, as compared to when the average vehicle power Pva after the engine warming up is high. Because of this, it is considered that the EV drive mode is selected more frequently. According to the present engine-based power generation control, in this kind of low average vehicle power condition, the power generation amount Wgw is increased while increasing the engine power Pe during the engine warm-up to achieve early warm-up and improvement of the engine thermal efficiency. Then, by the use of the electric power of the battery 38 increased by the increase in the power generation amount Wgw, the EV mileage after the engine warm-up can be extended. Consequently, it is possible to enhance the effect of improving the fuel efficiency of the entire vehicle trip.

On the other hand, when the average vehicle power Pva after the engine warm-up is equal to or higher than the power threshold value THp, the power generation amount Wgw during the engine warm-up is not increased (i.e., the method A is not used). In other words, the power generation amount Wgw is limited to be smaller than that when the average vehicle power Pva is lower than the power threshold value THp. Limiting the power generation amount Wgw during the engine warm-up in this way means that the power generation amount Wg is increased during the execution of the HV drive mode after the engine warm-up in order to obtain the electric power amount for EV running after the engine warm-up. Also, the fact that the average vehicle power Pva after the engine warm-up is high means that there are more opportunities for the hybrid vehicle 1 to run under the condition that the engine required power Per is high, as compared to when the average vehicle power Pva after the engine warm-up is low. Because of this, it is considered that the HV drive mode is selected more frequently. Therefore, according to the present engine-based power generation control, when the average vehicle power Pva is equal to or higher than the power threshold value THp, while the power generation amount Wgw during the engine warm-up is limited to be small, the power generation amount Wg of the engine-based power generation accompanied by the EGR can be expected to be increased under the high average vehicle power condition with excellent engine thermal efficiency during the execution of the HV drive mode after the engine warm-up (i.e., after the transition to the warm-up condition HC). As a result, the effect of improving the fuel efficiency of the entire vehicle trip can be enhanced for the above-described first and second reasons (reduction of the fuel consumption) and also the third reason (reduction of the electrical loss due to the charging and discharging of the battery 38). Namely, it is possible to enhance the effect of improving the fuel efficiency of the entire vehicle trip in a manner suitable for high average vehicle power conditions.

As described so far, according to the engine-based power generation control of the present embodiment, by considering the average vehicle driving power Pva in the vehicle running section after the engine warm-up is completed, the engine-based power generation can be performed in a manner excellent in the effect of improving the fuel efficiency of the entire vehicle trip.

2. Second Embodiment

A second embodiment according to the present disclosure will be described with reference to FIGS. 5 to 7.

2-1. Engine-Based Power Generation Control

The second embodiment is different from the first embodiment described above in the following points. That is, according to the engine power generation control of the first embodiment, the power generation amount Wgw during the engine warm-up is increased or decreased with the power threshold value THp of the average vehicle power Pva after the engine warm-up as a boundary. In contrast to this, according to the engine-based power generation control of the present embodiment, in accordance with the average vehicle power Pva after the engine warm-up, the power generation amount Wgw during the engine warm-up is continuously changed as shown in FIG. 5 below.

Figure 5:
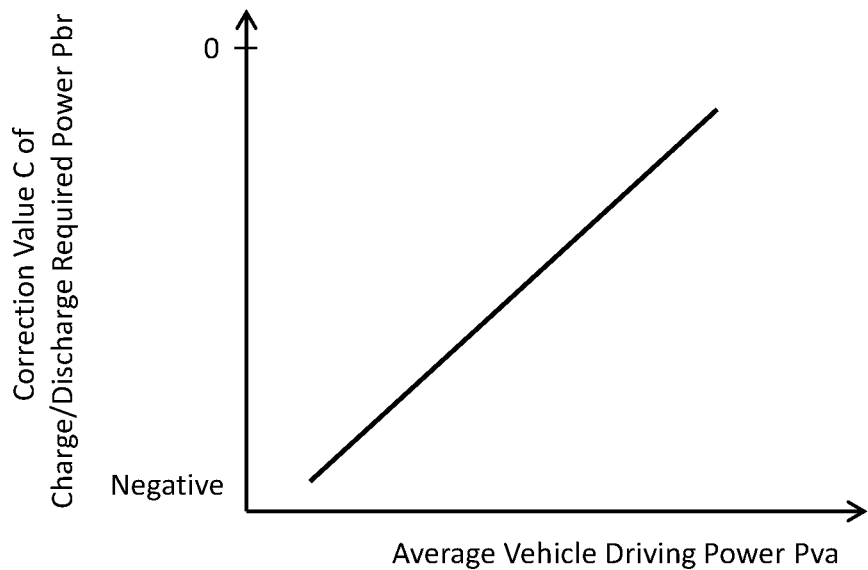
FIG. 5 is a graph showing a setting example of a relationship between a correction value C of a charge/discharge required power Pbr and an average vehicle driving power Pva after the engine warm-up when a request to charge a battery is issued during the engine warm-up.

FIG. 5 is a graph showing a setting example of the relationship between the correction value C of the charge/discharge required power Pbr and the average vehicle driving power Pva after the engine warm-up when a request to charge the battery 38 is issued during the engine warm-up. As shown in FIG. 5, in the present embodiment, the correction value C (negative value) of the charge/discharge required power Pbr is set to be greater (i.e., to be smaller as the absolute value thereof) when the average vehicle power Pva is higher. In the present embodiment, the corrected charge/discharge required power Pbrc is calculated by adding the correction value C determined in this way to the base value Pbr0 of the charge/discharge required power Pbr. Then, the calculated corrected charge/discharge required power Pbrc is used during the engine warm-up.

Figure 6:
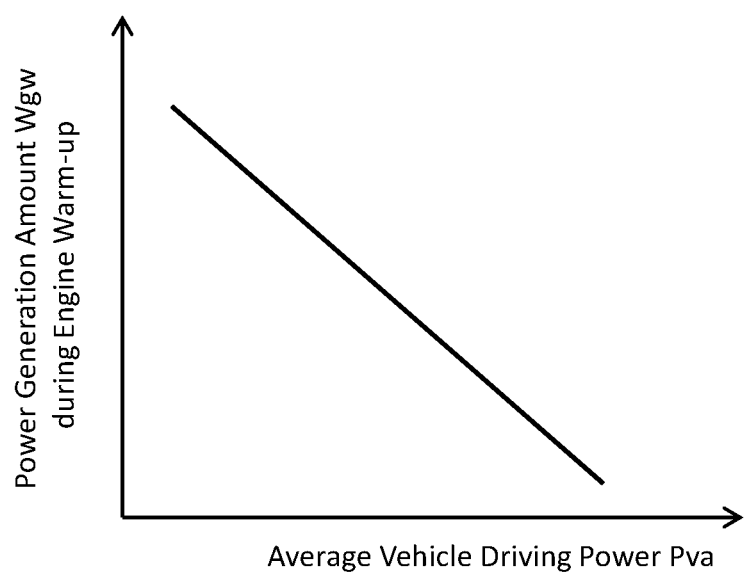
FIG. 6 is a graph showing an example of a relationship between the power generation amount Wgw during the engine warm-up and the average vehicle driving power Pva after the engine warm-up in an engine-based power generation control according to a second embodiment of the present disclosure.

FIG. 6 is a graph showing an example of the relationship between the power generation amount Wgw during the engine warm-up and the average vehicle driving power Pva after the engine warm-up in the engine-based power generation control according to the second embodiment. When the corrected charge/discharge required power Pbrc corrected by the correction value C having the setting shown in FIG. 5 is used, the higher the average vehicle power Pva after the engine warm-up is, the higher the generated power of the first MG 30 during the engine warm-up becomes. As a result, as shown in FIG. 6, the power generation amount Wgw is limited so as to be smaller when the average vehicle power Pva is higher. In other words, the power generation amount Wgw during the engine warm-up is increased by a greater amount when the average vehicle power Pva is lower.

Additionally, not only the example of the first embodiment, but also the example of the second embodiment in which the power generation amount Wgw is continuously changed in accordance with the average vehicle power Pva corresponds to a specific example of "limit an amount of power generated using the engine-based power generation in the cold condition so as to be smaller when the calculated average vehicle driving power is high than when the calculated average vehicle driving power is low" according to the present disclosure.

2-1-1. Processing by ECU

Figure 7:
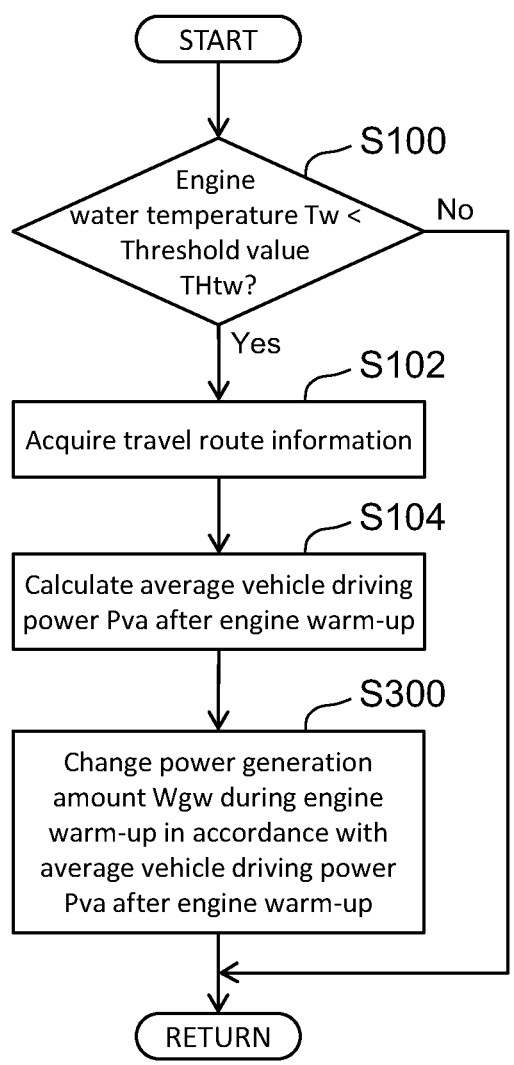
FIG. 7 is a flowchart illustrating a flow of processing performed for control of the power generation amount Wgw of the first motor generator (see FIG. 1) during the engine warm-up in the second embodiment of the present disclosure.

FIG. 7 is a flowchart illustrating the flow of the processing performed for the control of the power generation amount Wgw of the first MG 30 during the engine warm-up in the second embodiment. According to the engine-based power generation control of the present embodiment, instead of the processing of the flowchart shown in FIG. 3, the processing of the flowchart shown in FIG. 7 is executed together with the processing of the routine shown in FIG. 4.

The processing of steps S100 to S104 in FIG. 7 is as described in the first embodiment. In FIG. 7, the ECU 52 proceeds to step S300 after the processing of step S104.

In step S300, the ECU 52 changes the power generation amount Wgw during the engine warm-up in accordance with the calculated average vehicle driving power (average vehicle power) Pva after the engine warm-up. More specifically, the ECU 52 stores, as a map, the relationship as shown in FIG. 5, for example. In this step S300, the ECU 52 calculates the corrected value C depending on the average vehicle power Pva from this kind of map. Then, the ECU 52 calculates the corrected charge/discharge required power Pbrc by adding the calculated correction value C to the base value Pbr0. The corrected charge/discharge required power Pbrc calculated in this way is used to calculate the engine required power Per during the execution of the HV drive mode selected by the processing in step 200 shown in FIG. 4. As a result, the engine required power Per (=Pvr-Pbrc) becomes higher than the vehicle required power Pvr by the corrected charge/discharge required power Pbrc. Therefore, the power generation amount Wgw during the engine warm-up becomes smaller when the absolute value of the corrected charge/discharge required power Pbrc is smaller (that is, when the average vehicle power Pva after the engine warm-up is higher), as shown in FIG. 6.

2-2. Effect

According to the "further knowledge" described in the first embodiment described above, the total efficiency of fuel efficiency and electric power consumption during the HV drive mode accompanied by the EGR becomes higher when the average vehicle power Pva after the engine warm-up is higher. As a result, the effect of improving the fuel efficiency due to the selection of the EV drive mode decreases.

According to the engine-based power generation control of the present embodiment, the higher the average vehicle power Pva after the engine warm-up is, the smaller the power generation amount Wgw during the engine warm-up becomes. As a result, the power generation amount Wg by the engine-based power generation during the HV drive mode performed in association with the EGR after the engine warm-up becomes greater when the average vehicle power Pva is higher. That is, according to the present engine-based power generation control, the power generation amount Wg in a manner suitable for high average vehicle power conditions can be increased in synchronization with the increase in the average vehicle power Pva. Therefore, as compared with the first embodiment, it becomes possible to more effectively achieve the engine-based power generation control performed in a manner excellent in the effect of improving the fuel efficiency of the entire vehicle trip in accordance with the average vehicle driving power Pva after the engine warm-up. In other words, it becomes possible to more appropriately control the power generation amount Wgw during the engine warm-up in accordance with the average vehicle driving power Pva after the engine warm-up.

3. Other Embodiments

The engine-based power generation control according to the present disclosure can be applied not only to the power split type hybrid vehicle 1 shown in FIG. 1, as long as the hybrid vehicle according to the present disclosure is provided with the following premise configuration. That is, the present engine-based power generation control is applicable to a hybrid vehicle including an internal combustion engine having an EGR device, and an electric drive unit (one or more rotating electrical machines) that performs vehicle driving and engine-based power generation, and also including, as drive modes, an EV drive mode and an HV drive mode (i.e., a mode in which the hybrid vehicle is driven by the driving force of at least one of the electric drive device and the internal combustion engine while performing the engine-based power generation). Therefore, the present engine-based power generation control may be applied to, for example, either one of hybrid vehicles 2 and 3 of types described below with reference to FIGS. 8 and 9, respectively. It should be noted that the number of rotating electrical machine included in the electric drive device may be three or more.

Figure 8:
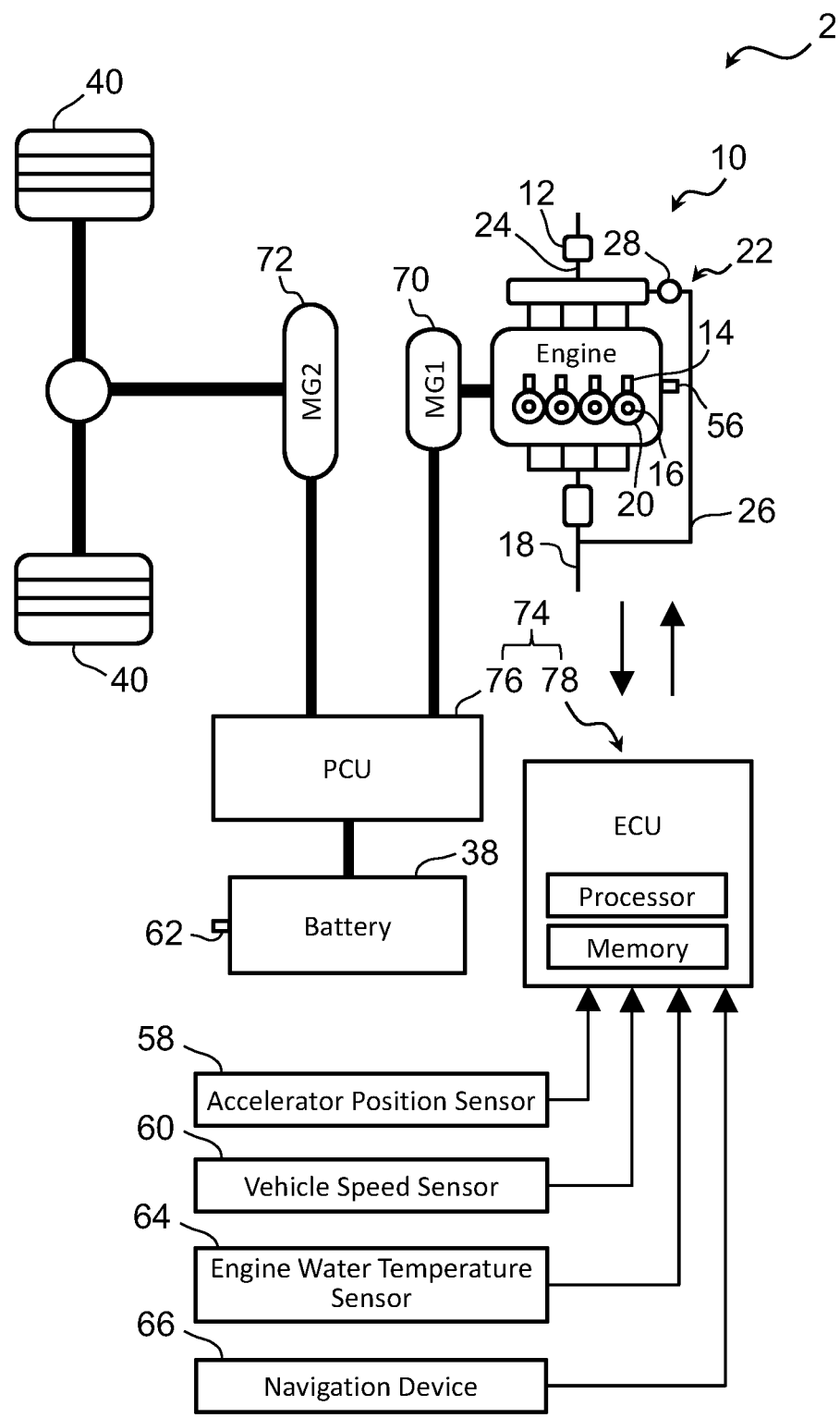
FIG. 8 is a schematic diagram showing a configuration of a powertrain system of another hybrid vehicle to which the present disclosure is applied.

FIG. 8 is a schematic diagram showing a configuration of a powertrain system of another hybrid vehicle 2 to which the present disclosure is applied. The hybrid vehicle 2 shown in FIG. 8 is a so-called series type hybrid vehicle. The hybrid vehicle 2 is mainly provided with the internal combustion engine 10 having the EGR device 22, a first MG 70 (MG1) and a second MG 72 (MG2) which are two rotating electrical machines as an electric drive device, the battery 38 (power storage device) and a vehicle control device 74. The vehicle control device 74 includes an ECU 76 and a PCU 78, and also has the same function as the vehicle control device 50 shown in FIG. 1.

In the hybrid vehicle 2, the first MG 70 that mainly functions as a generator performs the engine-bases power generation. Also, the second MG 72 that mainly functions as an electric motor drives the vehicle wheels 40. More specifically, in the EV drive mode of the hybrid vehicle 2, the vehicle running is performed by driving the second MG 72 (electric drive device) using the electric power of the battery 38. In addition, in not only the EV drive mode but also the HV drive mode, the vehicle running is performed only by the driving force of the second MG 72.

To be more specific, in the HV drive mode, the vehicle running is performed only by the driving force of the second MG 72 while performing the engine-based power generation using the first MG 70. Therefore, even in this hybrid vehicle 2, similarly to the hybrid vehicle 1, when the average vehicle driving power Pva after the engine warm-up is high, the power generation amount Wgw during the engine warm-up is limited to be small, and the engine-based power generation accompanied by the EGR is performed after the engine warm-up. As a result, it is possible to increase the effect of improving the fuel efficiency of the entire vehicle trip due to not only the first and second reasons described above (reduction of the fuel consumption) but also the third reason described above (reduction of the electrical loss due to the charging and discharging of the battery 38). It should be noted that, as in this example of the hybrid vehicle 2, the hybrid vehicle to which the present disclosure is applied may not necessarily be configured to ravel the vehicle by the driving force of the internal combustion engine.

Figure 9:
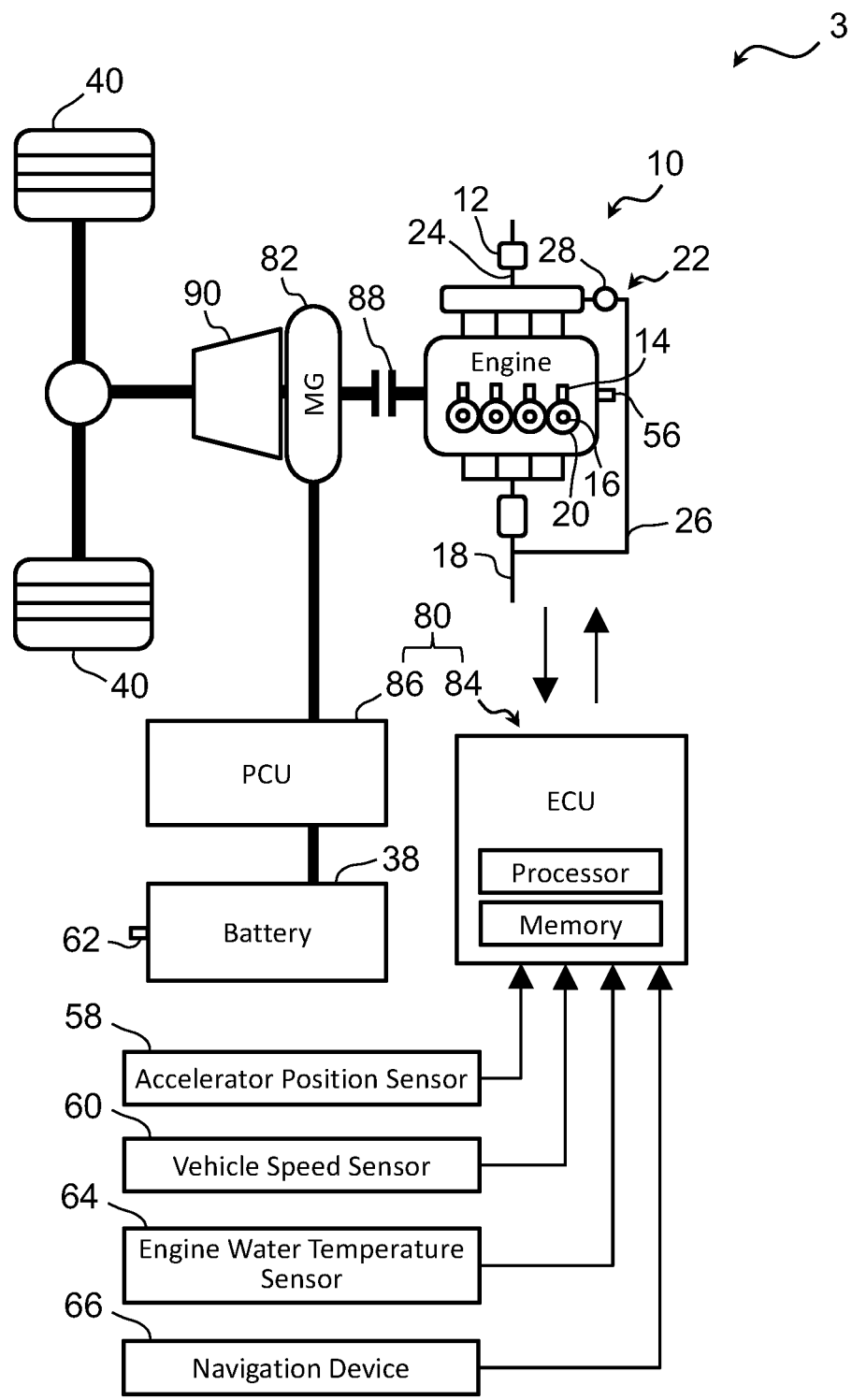
FIG. 9 is a schematic diagram showing a configuration of a powertrain system of another hybrid vehicle to which the present disclosure is applied.

FIG. 9 is a schematic diagram showing a configuration of a powertrain system of another hybrid vehicle 3 to which the present disclosure is applied. The hybrid vehicle 3 shown in FIG. 9 mainly includes a motor generator (MG) 82 being one rotating electrical machine as an electric drive device, in addition to the internal combustion engine 10 having the EGR device 22, the battery 38 (power storage device) and a vehicle control device 80. The vehicle control device 80 includes an ECU 84 and a PCU 86, and also has the same function as the vehicle control device 50 shown in FIG. 1. The hybrid vehicle 3 is provided with a clutch 88 for connecting/disconnecting the power transmission path between the internal combustion engine 10 and the MG 82. It should be noted that an automatic transmission 90 is disposed between the MG 82 and the vehicle wheels 40.

In the hybrid vehicle 3, the MG 82 selectively executes both the vehicle drive and the engine-based power generation. More specifically, in the EV drive mode, the vehicle running is performed only by the driving force of the MG 82 (electric drive device) using the electric power of the battery 38 while the clutch 88 is disconnected. In the HV drive mode, the vehicle running is performed, with the clutch 88 connected, only by the driving force of the internal combustion engine 10 while performing the engine-based power generation using the MG 82.

In the hybrid vehicle 3, the electric power generated using the engine-based power generation described above is stored in the battery 38 and used in the subsequent EV drive mode. Therefore, according to this hybrid vehicle 3, when the average vehicle driving power Pva after the engine warm-up is high, by limiting the power generation amount Wgw during the engine warm-up to be small and also by performing the engine-based power generation accompanied by the EGR after the engine warm-up, the effect of improving the fuel efficiency of the entire vehicle trip can be enhanced due to the first and second reasons described above (reduction of the fuel consumption).

The embodiments and modification examples described above may be combined in other ways than those explicitly described above as required and may be modified in various ways without departing from the scope of the present disclosure.

What is claimed is:

1. A vehicle control device for controlling a hybrid vehicle,
   the hybrid vehicle including:
   an internal combustion engine that includes an EGR device configured to perform exhaust gas recirculation that causes a part of exhaust gas discharged to an exhaust gas passage to recirculate into a cylinder;
   an electric drive device that includes one or more rotating electrical machines and is configured to drive the hybrid vehicle and perform an engine-based power generation being electric power generation using power of the internal combustion engine;
   a power storage device configured to be chargeable and dischargeable by transmitting and receiving electric power to and from the electric drive device; and
   a travel route acquisition device configured to acquire a travel route information from a departure point to a destination of the hybrid vehicle,
   the hybrid vehicle having drive modes that include:
   an EV drive mode in which the electric drive device is driven by the electric power of the power storage device to drive the hybrid vehicle without using a driving force of the internal combustion engine; and
   an HV drive mode in which the hybrid vehicle is driven by a driving force of at least one of the electric drive device and the internal combustion engine while performing the engine-based power generation,
   the vehicle control device comprising a processor configured to:
   where the hybrid vehicle is started under a cold condition in which temperature of the internal combustion engine is lower than a temperature threshold value that allows a start of the exhaust gas recirculation, calculate, based on the travel route information, an average vehicle driving power in a vehicle running section under a warm condition after the temperature of the internal combustion engine reaches the temperature threshold value after the start of the hybrid vehicle; and
   limit an amount of power generated by the engine-based power generation in the cold condition so as to be smaller when the calculated average vehicle driving power is high than when the calculated average vehicle driving power is low, and, during the HV drive mode after a transition to the warm condition, execute the engine-based power generation accompanied by the exhaust gas recirculation with an EGR ratio that increases engine thermal efficiency.

2. The vehicle control device according to claim 1, wherein
   the vehicle control device is configured to reduce the amount of power generated using the engine-based power generation in the cold condition by a greater amount when the calculated average vehicle driving power is higher.

* * * * *